(12) United States Patent
Müller et al.

(10) Patent No.: US 7,931,345 B2
(45) Date of Patent: Apr. 26, 2011

(54) MOTOR VEHICLE BRAKE SYSTEM HAVING A LOW PRESSURE ACCUMULATOR

(75) Inventors: Jochen Müller, Marburg (DE); Faouzi Attallah, Darmstadt (DE); Dieter Burkhard, Bingen (DE); Andreas Kohl, Mainz (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 12/307,797

(22) PCT Filed: Jul. 11, 2007

(86) PCT No.: PCT/EP2007/057079
§ 371 (c)(1),
(2), (4) Date: Sep. 24, 2009

(87) PCT Pub. No.: WO2008/006845
PCT Pub. Date: Jan. 17, 2008

(65) Prior Publication Data
US 2010/0045099 A1    Feb. 25, 2010

(30) Foreign Application Priority Data

Jul. 11, 2006  (DE) .......................... 10 2006 032 291
Jul. 11, 2007  (DE) .......................... 10 2007 032 588

(51) Int. Cl.
*B60T 13/16* (2006.01)
(52) U.S. Cl. ........................................................ 303/10
(58) Field of Classification Search ................ 303/3, 10, 303/11; 701/70
See application file for complete search history.

(56) References Cited

U.S. PATENT DOCUMENTS

| | | | |
|---|---|---|---|
| 5,487,593 A | 1/1996 | Potts et al. | |
| 5,522,650 A * | 6/1996 | Negrin et al. | 303/10 |
| 5,632,531 A | 5/1997 | Batistic et al. | |
| 6,145,940 A * | 11/2000 | Fuhrer et al. | 303/113.4 |
| 6,188,947 B1 * | 2/2001 | Zhan | 701/71 |
| 6,339,738 B1 | 1/2002 | Kohl et al. | |
| 6,668,634 B1 | 12/2003 | Zimmermann et al. | |
| 7,174,247 B2 | 2/2007 | Gronau et al. | |
| 2006/0175895 A1 | 8/2006 | Mahlo et al. | |
| 2006/0202552 A1 | 9/2006 | Magel et al. | |
| 2008/0093919 A1 | 4/2008 | Klug et al. | |
| 2008/0231108 A1 | 9/2008 | Attallah et al. | |

FOREIGN PATENT DOCUMENTS

| | | |
|---|---|---|
| DE | 42 326 14 A1 | 3/1994 |
| DE | 196 32 311 A1 | 2/1998 |
| DE | 199 46 777 A1 | 4/2001 |
| DE | 103 09 418 A1 | 11/2003 |

(Continued)

*Primary Examiner* — Christopher P Schwartz
(74) *Attorney, Agent, or Firm* — RatnerPrestia

(57) ABSTRACT

A motor vehicle brake system having a hydraulic cable, via which a wheel brake module can be pressurized by a brake medium using brake pressure from a brake cylinder and to which a low pressure accumulator is connected for temporarily receiving excess brake medium, wherein the low pressure accumulator is connected to the hydraulic cable via a backflow line and a return pump interposed in the return line in order to return temporarily stored brake medium, the return pump being cyclically actuated for adjusting the pump capacity such that an activation occurs within each braking cycle during a portion of pump cycles that corresponds to the pump capacity, is intended to provide particularly high operational safety while also providing a comfortable pedal sensation.

4 Claims, 1 Drawing Sheet

FOREIGN PATENT DOCUMENTS

| | | |
|---|---|---|
| DE | 10 2004 045 391 A1 | 3/2006 |
| DE | 10 2006 004 745 A1 | 11/2006 |
| DE | 10 2005 041 556 A1 | 3/2007 |
| WO | WO 9418041 | 8/1994 |
| WO | WO 9615927 | 5/1996 |
| WO | WO 03 082 645 A1 | 10/2003 |
| WO | WO 2005/007475 A | 1/2005 |

* cited by examiner

MOTOR VEHICLE BRAKE SYSTEM HAVING A LOW PRESSURE ACCUMULATOR

CROSS REFERENCE TO RELATED APPLICATIONS

This application is the U.S. national phase application of PCT International Application No. PCT/EP2007/057079, filed Jul. 11, 2007, which claims priority to German Patent Application No. DE102006032291.6, filed Jul. 11, 2006 and German Patent Application No. DE102007032588.8, filed Jul. 11, 2007, the contents of such applications being incorporated by reference herein.

BACKGROUND OF THE INVENTION

1. Field of the Invention

The invention relates to a motor vehicle brake system having a hydraulic line.

2. Description of the Related Art

The invention relates to a motor vehicle brake system having a hydraulic line via which brake pressure can be applied by a brake cylinder to a wheel brake module by means of a braking medium, and to which a low pressure accumulator for temporarily receiving excess braking medium is connected, wherein the low pressure accumulator is connected to the hydraulic line in order to feed back buffered braking medium via a feedback line and a feedback pump which is connected into the feedback line, and the feedback pump is actuated cyclically in order to set the delivery capacity in such a way that activation occurs within each braking cycle during a portion of pump strokes corresponding to the delivery capacity, and to a method for its operation.

Such a brake system is generally used within the scope of an ABS system, wherein, in such systems, the feed pump which is connected into the feedback line is typically controlled as a function of what is referred to as the admission pressure, that is to say the pressure which is present between the master brake cylinder and the inlet valve of the wheel brake module.

DE 199 46 777 A1 discloses a method which uses the run-on voltage of a motor of a pump which is operated in a clocked fashion and which is used to feed back brake fluid from an accumulator chamber, arranged at the outlet end of a wheel brake cylinder, into a master brake cylinder, and the accumulator chamber pressure which is determined or measured in the accumulator chamber, to estimate an admission pressure prevailing between the master brake cylinder and an inlet valve of the wheel brake cylinder of a motor vehicle brake system.

Furthermore, DE 10 2005 041 556 A1 discloses a method for determining the admission pressure which prevails between the master brake cylinder and the inlet valve of the wheel brake cylinder. The latter determines the admission pressure taking into account the profile of a run-on voltage of a motor of a pump which is operated in a clocked fashion and which is used to feed back brake fluid from a low pressure accumulator into the master brake cylinder. In this context, a plurality of characteristic variables of the voltage profile are measured and are respectively used to determine an admission pressure value. Furthermore, the admission pressure values which are determined from the various characteristic variables are averaged, and the admission pressure values are averaged over time in order to damp fluctuations.

To do this, use is made of evaluation of the quality and/or reliability of the measured characteristic variables, filtering and/or conditioning of the characteristic variables and/or of the admission pressure values determined therefrom when there is insufficient quality and/or reliability of the measured characteristic variables, and only pressure values of a similar magnitude are used for this.

The motor vehicle brake system can comprise one or else a plurality of low pressure accumulators. Two low pressure accumulators, which do not necessarily have to have the same filling level during operation, are preferably provided.

The filling level of the low pressure accumulator results from the volume which is let into the low pressure accumulator by the outlet valves for the wheel cylinders, and from the feed volume of the pump which empties the low pressure accumulator. The inlet quantity during an ABS control process is known to depend on the actuation time of the outlet valves and the wheel cylinder pressure. The wheel cylinder pressure is known to be able to be calculated on a model basis if no pressure sensor is present, and it is usually available in an ABS control program as a parameter. The actuation times are also known so that the volume inflow can also be determined by approximation. The volume inflow from the low pressure accumulator is obtained in a way known per se by considering the generator voltage of the pump. Finally, it is therefore possible to calculate, from the available information, the filling level of the low pressure accumulator during an ABS control process at least to a certain degree of approximation (low pressure accumulator model).

If a wheel in an ABS-controlled brake system exhibits the tendency to come to a standstill, the brake pressure in the hydraulic brake circuit is lowered by virtue of the fact that the quantity of brake fluid is reduced in the circuit. This extracted brake fluid is buffered in a number of separate low pressure accumulators and can easily be fed back again into the brake circuit when a corresponding request occurs.

The available quantity of brake fluid which is measured or estimated on the basis of the aforesaid model calculation is used in the brake system of a motor vehicle as main criterion for assessment of a situation in the LPA. The behavior of the wheels of the vehicle is also evaluated for the sake of completeness and for self-monitoring of the vehicle systems.

The entire ABS-controlled braking process will only require minimum switching-on of the brake pump. The following requirements are made of the brake system for this purpose:
1. The pump is to be used as economically as possible.
2. The noise of the pump is to be reduced as far as possible.
3. As a function of the pump activity it should be ensured that only relatively small fluctuations occur in the rise in pressure.
4. The rebound of the brake pedal will be reduced as far as possible.
5. At any time, sufficient free space is to be available in the LPR or LPA to take up excess pressure.
6. All the said requirements are to be capable of being met independently of the type of vehicle and of operating temperatures and of other conditions.

During an ABS-controlled braking process, the quantity of brake fluid within the LPA is the result of two processes running in parallel:
1. Inflow ($V_{in}$): the quantity of brake fluid which is extracted from the brake circuit characterizes a drop in pressure which is caused by the ABS system.
2. Outflow ($V_{out}$): this is understood to be the return flow of brake fluid into what is referred to as the THC circuit. THC is the term for what is referred to as the tandem master cylinder, i.e. the master brake cylinder which is used to take up the brake fluid and to increase pressure on request.

As a result, the quantity of brake fluid which is available in the LPA is calculated from the formula $V_{LPA}=V_{in}-V_{out}$.

A low pressure accumulator is known to have a pressure profile which is dependent on the filling level. If the filling level is low, the pressure in the low pressure accumulator is low. The higher the filling level, the higher the pressure in the low pressure accumulator. The feedback pump which is present in a motor vehicle brake system with a low pressure accumulator could in principle always be operated at full power, with the result that the low pressure accumulator would be continuously empty. However, for reasons of energy consumption, of the generation of noise and of the pedal sensation, this is not expedient, wherein in particular an excessively frequent pump activity reduces the pedal sensation.

In addition, methods which are known per se for controlling the pumps, for example control by means of which the wheel pressure is adjusted from an actual value to a predefined setpoint value, are not optimal in all driving situations. For example, when brakes are adjusted to a very low coefficient of friction, the low pressure accumulator may not be sufficiently emptied.

In this case, the pressure in the low pressure accumulator is too large to permit the brakes to be released in accordance with the demand by allowing the braking medium to flow out of the hydraulic line via the outlet valves of the wheel cylinders into the low pressure accumulator, and therefore permit a reduction in the pressure in the wheel brake module. The operational reliability of the system could therefore be adversely affected.

SUMMARY OF THE INVENTION

The invention relates to specifying a motor vehicle brake system of the type mentioned at the beginning which provides a particularly high level of operational reliability accompanied by a comfortable pedal sensation.

This is achieved in that a control unit which is assigned to the feedback pump outputs a control value for the number of pump strokes for the feedback pump during the braking cycle, on the basis of a predefined initial value, adjusted adaptively taking into account the filling level in the low pressure accumulator and/or its derivative over time.

The invention relates to the idea that for a comfortable pedal sensation or generally a high level of user comfort the number of activations of the pump, that is to say the number of pump cycles, should be kept particularly low. In order, nevertheless, to ensure a particularly high level of operational reliability in each case, a pump activation should be initiated particularly appropriately for demand and therefore aimed at the current operating state. For this purpose, there is provision for the state of the vehicle and the driving situation to be based on selective taking into account of individual, suitably selected parameters during the control of the pump, with deliberate turning away from the concept of activation of a pump according to a previously defined pump model which can no longer be changed. These parameters include ones which are defined by means of driving situations and operating states such as overfilled low pressure accumulator,
low coefficient of friction situation and
stationary state or approximately stationary state of the pump.

In particular the filling level in the low pressure accumulator per se is provided as a parameter here. However, in an alternative or additional embodiment, the derivative over time or the gradient of this filling level can also be taken into account so that the pump control also involves a type of prognosis of the identified trend during the acquisition of this filling level. A pump actuation to which the gradient is added is therefore configured in the manner of a transition from a potential (P) characteristic to a combined proportional-differential (PD) characteristic of a closed-loop control system.

Furthermore, temperature values or viscosity values of the low pressure system can also be taken into account as parameters.

In order to carry out a particularly precise assessment of the respective driving situation and to permit the control unit to acquire a control value which supplies the information necessary to discharge the brake fluid from the low pressure accumulator to the feed pump on an adaptive basis, that is to say by derivation from empirical values which are specific to the motor vehicle, a characteristic value is advantageously provided which is derived from wheel speeds, in particular the slip of one or more wheels.

In order to be able to supply the control unit with information which is necessary for the assessment of the driving situation and the need to activate the pump, a voltage measurement, that is to say the acquisition of an EMF (electromotive force) of the pump, is provided, in which case the pump runs for at least one working cycle in the idling mode during a braking cycle and the voltage which is generated from the activity of the pump in the idling mode permits conclusions to be drawn about the force which is necessary to overcome the pressure in the low pressure accumulator.

The advantages which are achieved with the invention consist, in particular, in the fact that by taking into account the filling level in the low pressure accumulator directly and/or in conjunction with its derivative over time in the actuation of the feedback pump, dynamic detection of the pumping power and its efficiency is made possible. In this context, extreme situations such as excessively high or excessively low pressure in the brake system which can influence the reliability and the comfort can be avoided selectively in ABS-controlled braking processes, and the operational reliability of the motor vehicle, accompanied by a high comfort level, can therefore largely be ensured for the user.

For complete monitoring of the pump during a cycle, that is to say an ABS-controlled braking process, and adaptive control of the activation of the pump, three phases of the monitoring can be provided:

1. Out/off monitoring phase:
    This stage is initiated in order to characterize a time period which lies outside the cycle of an ABS-controlled braking process while the pump is not functioning. This stage serves to reset all the parameters which are required for the evaluation of the ABS-controlled braking process and is what is referred to as a reset.
2. The monitoring phase:
    During an ABS-controlled braking process, the time interval of the pump can assume a value of 1 to 11. This value depends on many conditions. These are listed separately below. This very important phase is the core of the adaptive monitoring of the pump.
3. The final monitoring phase:
    This phase has two particular objectives which are to be achieved:
    1. To smooth the exit from an ABS-controlled braking process, i.e. to avoid bringing about an extreme situation or to stay in an extreme situation, in particular as far as the position and movement of the brake pedal are concerned.
    2. To prepare the conditions for a possible subsequent ABS-controlled braking process.

In a pump monitoring phase, a plurality of subordinate phases are listed from the initiation of the braking process to the monitoring of the quantity of fluid (in the LPA). For self-monitoring, this pump monitoring phase also utilizes the evaluation of the states of the vehicle wheels in order to check and adjust the time intervals of the pump.

This specific process is monitored and accompanied by an assisting interface, which is used in parallel.

The key parameters include, for example, the quantity of fluid. If two or more low pressure accumulators (LPA are used, the inflow of brake fluid into these accumulators is not necessarily identical or occurs synchronously. For this reason, in this situation it is particularly advantageous to use the maximum of all the liquid levels.

Furthermore, the pumping power is an important factor: if the supply power is preset to a specific constant value, only the highest pump interval makes available the maximum motor torque.

In the case of a PWM actuation of the motor, PWM meaning pulse-width-modulation, the motor is preferably actuated with a fixed PWM frequency in which the "ON" time of the PWM, that is to say the duty cycle, is variable. Owing to the digital actuation, the "ON" time can preferably be actuated only in specific minimum increments which have a length of, for example, 5 ms. If, for example, the pump is to be actuated with an "ON" time of 10 ms, a suitable internal value L is set to the value 2. L=1 would accordingly correspond to a pulse length "ON" of 5 ms.

In the "OFF" phase of the PWM actuation it is possible to determine the generator voltage of the motor in a way which is known per se. The brake system according to aspects of the invention therefore preferably also comprises a device for determining and evaluating the generator voltage of the motor. By means of the evaluation it is possible to determine whether the pump feeds anything at all at a specific power actuation level, for example with a value of L=150. If the power of the pump is too low, the pump does not start up. This can be determined from the fact that no generator voltage occurs in the "OFF" phase.

Since the pump has to operate against high mechanical forces, caused by the pressure of the tandem master cylinder (THC) on the pistons, this is an important criterion during the ABS-controlled braking process. If this generated motor torque is not sufficient to overcome the pressure from the THC at a time at which the pump is under particularly high loading, the pump does not operate. This can have catastrophic consequences for the functioning of the entire ABS system.

Before the ABS system is used, the abovementioned outflow of the pump should be compared with typical pressures of the THC. Such a consideration also permits the difference in the throughflow between two successive pump intervals to be calculated/evaluated. From the acquired empirical values it is possible to acquire reference parameters for adaptive initiation of the pump activation processes.

When the ABS system is activated, the pump is also activated. The activation of the pump with specific timing is a particularly critical time since the LPA possibly has to be completely emptied at the beginning of an ABS-controlled braking process. This may be dependent on the condition of the surface of the road, for example in the case of ice on the road or snow, and on the pressure used which is made available by the THC.

To be on the safe side, the entry value of the pump interval can be preset using the power specifications of the pump. If these are not known, for reasons of safety, the pump activity should be initiated with the value 2, and the THC pressure which is used/estimated should be monitored. If it is above a predefined value, for example 100 bar, the pump interval should be increased consistently.

An LPA is typically divided into two areas by a movable piston. On the side lying opposite the accumulator input, this movable piston is supported by a compression spring. When there is an extremely low coefficient of friction between the wheel and surface of the roadway, a residual pressure of a few bar in the LPA can already cause wheels to block since it is not possible to lower the wheel pressure, if necessary as far as 0 bar.

In this case, the pump interval should be increased immediately and significantly in order to empty the LPA as quickly as possible and reduce the pressure to a value near to zero.

The pump interval should be increased at least by the value "1" in order to ensure a rapid way out of this situation. If this situation continues, the pump interval has to be increased again.

In the opposite case, if, for example, one or more wheels exhibits the tendency to accelerate, the pump interval should be reduced again.

Use of a long pump interval should be strictly restricted in order to meet the requirements which are made. This situation is therefore also particularly interesting because it permits calculation of what is referred to as the wheel blocking volume, that is to say of the maximum quantity of fluid in the LPA, which causes blockage of a wheel/several wheels.

Under perfect ambient conditions, monitoring of the quantity of fluid is sufficient to satisfy the requirements. Exceptions to this cannot be easily predicted. For this reason, a particular interface is conceived which is used in these exceptional situations. This interface will be described later.

Because of the fluctuations in the level of the brake fluid in the IPA, the flow rate of brake fluid cannot be used directly as a parameter but can be evaluated and calculated as follows:
1. When a new pump interval is initiated, a reference value for the quantity of brake fluid is recorded.
2. In each pass, the maximum quantity of fluid in the LPA is measured and recorded.
3. After each PWM has ended, an average quantity of the individual passes is calculated, in precisely the same way as the average flow rate constitutes an accumulated average quantity which is calculated from the difference between the average quantity of the individual passes and the initially recorded reference value of the quantity of brake fluid.

After these calculations, the value of the flow rate can be used as a parameter. After the initial pump interval has been applied, observation of the flow rates can be used to check whether the pump interval and the flow rate
  are too high and have to be reduced,
  are such that these values can be maintained, or
  are so low that the number of cycles has to be increased.

Through corresponding adaptation or adjustment of the pump control, said control is thus configured to be adaptive.

A rise in the flow rate occurs primarily when there is a change in the surface of the roadway, for example at a transition from asphalt to ice, i.e. what is referred to as the outflow of the LPA is lower than what is referred to as the inflow.

Any decision which occurs in such a case is based on the value of the accumulated average quantity on the one hand and the difference in flow between two successive pump intervals on the other.

If, for example, the accumulated average quantity $Q_{cum}$ is higher than the difference in the flow rate $dQ_p$ between two consecutive pump intervals, an increase in the pump interval should be initiated.

For example, the pump interval is raised by the value 1 if $Q_{cum}=150$ mm$^3$ and $dQ_p=120$ mm$^3$.

If $Q_{cum}=300$ mm$^3$ with an unchanged $dQ_p$, the pump interval is increased by the value 2.

The increase in the pump interval is limited by the maximum operative value to which the pump interval can be set. The behavior when the flow rate drops in the opposite direction is to be considered analogous to this.

The flow rate precisely compensates what is referred to as the inflow of the pump. The pump interval which is used at the beginning should be maintained. The accumulated flow rate in the LPA should not be too close to the quantity which causes blockage of one or more wheels.

During a predefined pump interval, the brake fluid level in the LPA varies between a minimum and a maximum value. During such a cycle, the maximum level of fluid which is reached is recorded and noted as a reference value.

Any request is checked once more after the pump interval has been increased: if the quantity which is calculated at this time is below the limit formed by the reference value, the request is declined after an increase in the pump interval. As a result, a constant pump interval is ensured and nongenuine fluctuations, which would otherwise trigger abrupt and unnecessary changes in the pump interval, are avoided.

One particular monitoring phase has specifically been developed for countering any unpredictable behavior of any vehicle wheel. There are a large number of different reasons which could cause such unpredictable behavior. These include, for example, a drastic change in the condition of the roadway and other preconditions. This is apparent during the ABS control in the behavior of the wheel speeds which is indicated below.

Two possibilities which result from such an event are conceivable:
- it is detected that the pump is operating too slowly. For safety reasons, an immediate increase in the pump interval is initiated.
- Due to comfort considerations, the pump speed is reduced by lowering the pump interval if it is detected in this particular monitoring phase that the pump is operating too quickly.

Another result is the quality of the measurement and/or modeled estimation/calculation of the level of the brake fluid in the LPA. If, in such a case, the APC necessarily calculates an incorrect value for the pump interval due to incorrect input values, compensation advantageously occurs by virtue of the fact that one of the described situations occurs, specifically detection in this particular monitoring phase that the pump is either operating too quickly or too slowly.

By taking into account the techniques listed below, a pump which is operating too slowly, that is to say an excessively short pump interval, can easily be diagnosed:

Similarly to the situation of an extremely low coefficient of friction between a wheel/several wheels and the surface of the roadway, the slip of one or more wheels, that is to say spinning, can be detected with, for example, a value of 60%. The main reason for this is the residual pressure in the LPA, even though a reduction in pressure would be required for an ABS-controlled braking process. In this case, the pump interval is raised by a large increment.

If the slip of the wheel or wheels does not decrease after the already mentioned learning phase and the increasing of the pump interval by a large increment, the pump interval continues to be increased. This alarm-like situation continues until the slip of the wheel or the wheels has become smaller, has dropped, for example, below 30%.

Another technique for detecting an excessively low pump interval and therefore a pump which is operating too slowly is to monitor the power of the electric motor of the pump if the flow rate cannot be measured. A very low power value permits it to be assumed that the motor is blocked. In this case, the brake fluid cannot flow through and the risk of the LPA running when full of brake fluid is high.

In such a case, the power of the pump has to be raised by increasing the pump interval. A small increment, for example increasing the pump interval by the value 1, is usually sufficient to overcome the problem. If this step is not successful, an increment of double the length, that is to say increasing the pump interval by the value 2, is carried out.

It is possible for the flow rate to increase very slowly. In other cases, the increase is so large and abrupt that the total quantity exceeds by far the quantity which is sufficient to block the wheel or wheels, and said quantity possibly approaches the limit of the LPA. It is then a case of a situation which affects the safety of the vehicle and of its occupants as well as the surrounding road traffic. In this case, the pump interval has to be increased greatly until this large and abrupt rise has been processed. After this objective has been reached, the pump interval assumes its initial value again.

In a way which is analogous with a pump which operates too slowly, the said pump can also operate too quickly. However, this is not a safety problem but rather the comfort is merely affected by a pump which is operating too quickly for a short time. However, if the excessively fast activity of the pump extends over a relatively long time period, the service life of the pump can be seriously impaired. This is typically the result of an incorrect quantity of fluid in the LPA or incorrect signaling about the level of fluid, which leads to an excessively long pump interval, and therefore to a relatively high flow rate.

Alternatively, it is possible for the pressure in what is referred to as the THC to drop, and this frees the piston in the pump consistently from the mechanical loading. A relatively high power of the electromotor can therefore be achieved.

In such a situation, the delivery capacity of the pump should be lowered by reducing the pump interval. This is done, in a way which is analogous to the steps already described, by means of a small step, by reducing the pump interval by the value 1, in the case of a pump which is operating too quickly. If this reduction is not successful, a double step, that is to say the reduction of the pump interval by the value 2, is implemented.

An exemplary embodiment will be explained in more detail with reference to a drawing.

BRIEF DESCRIPTION OF THE DRAWING

The invention is best understood from the following detailed description when read in connection with the accompanying drawing. Included in the drawing is the following figure.

DETAILED DESCRIPTION OF THE PREFERRED EMBODIMENT

Figure 1:
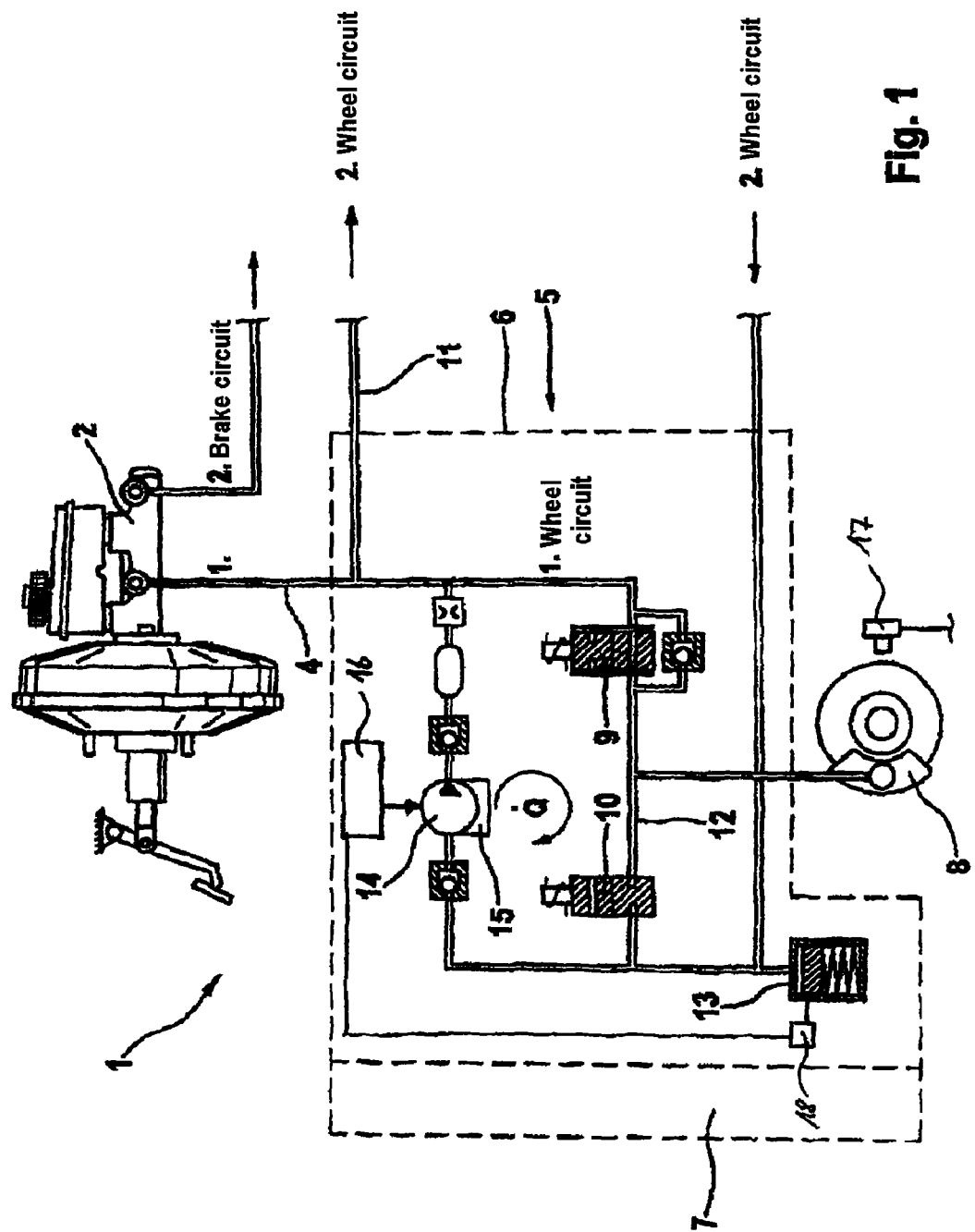
FIG. 1 is a schematic representation of a brake circuit of a slip-controlled motor vehicle brake system.

FIG. 1 shows by way of example a brake circuit of a slip-controlled motor vehicle brake system 1 in which only one wheel brake circuit is illustrated. The brake system 1 comprises a brake unit with a master brake cylinder 2 which is connected to a wheel brake 8 via a hydraulic connection 4 and a distributor device 5 which comprises a hydraulic unit 6 and an electronic unit 7. The hydraulic unit 6 has a holding body for hydraulic and electrohydraulic components such as inlet and outlet valves 9, 10 for each wheel brake 8 which can be actuated electro-magnetically. In the connection 4—still upstream of an inlet valve 9, opened in the currentless state, for said wheel brake 8—there is a branch 11 to a second wheel brake circuit. Starting from the wheel brake 8, a return connection 12 runs via the outlet valve 10, closed in the currentless state, to a low pressure accumulator 13 which is configured to hold the volume of hydraulic fluid which is let out from the wheel brake 8 owing to ABS control cycles.

The low pressure accumulator 13 feeds an intake side of a motor-driven pump 14. Said pump 14 is preferably embodied as a radial piston pump and has valves (not illustrated here). These respectively include an intake valve on the intake side and a delivery valve on the delivery side.

The motor 15 and pump 14 are preferably embodied as an assembly (motor pump assembly) and permit hydraulic fluid which has been let out to be fed back in the direction of the master brake cylinder 2. The brake system typically includes additional functionalities such as, for example, an electronic traction controller (ESP) which in turn requires an isolating valve which is connected upstream of the inlet valve 9, can be actuated electromagnetically and is open in the currentless state.

During an ABS control process, a pressure difference occurs at the inlet valve 9 owing to pressure reduction processes across the outlet valve 10. The volume which has escaped from the wheel brake 8 passes into the low pressure accumulator 13. At the same time, the pump 14 is activated and it feeds the volume which has been let out, counter to the prevailing admission pressure, back again in the direction of the master brake cylinder 2 and upstream of the inlet valve 9.

In order to control the delivered quantity of the pump 14 according to demand during an ABS braking process, a control unit 16 is connected upstream of the pump 14. This control unit 16 creates, from operating variables of the motor vehicle which are characteristic of the respective driving situation, a control value which it transmits to the pump 14.

The control unit 16 is fed at the data input end with information which identifies the necessary operating data for assessment of the driving situation as well as the operating situation in the brake system 1 and permits, on the basis of these parameters in conjunction with the acquired reference data, adaptive power control of the feed pump 14.

In this context, each braking cycle is divided into a number of pump strokes. A predefined number of pump strokes serve to set the pump 14 for an initial value. Depending on the driving situation and operating state, the number is adjusted in an adaptive fashion in order to influence the delivery capacity of the pump 14. In each braking cycle, at least one pump stroke is to be reserved for freewheeling of the pump 14, during which the pump is not driven by the motor 15. In this pump stroke, the pump 14 generates, during the idling which is made possible by the omission of the drive force, a voltage which can be measured. This voltage permits the EMF to be calculated, and on the basis of this it is possible to assess whether the pump 14 is operating against a high pressure, that is to say a high filling level in the low pressure accumulator 13. For this reason, such a pump stroke in which the pump 14 is not driven is important for the identification of the control value.

The identified data which are transmitted to the control unit 16 include the filling level of the brake fluid in the low pressure accumulator 13, information about the rotational speeds, in particular the slip, at the wheels of the motor vehicle which is obtained by means of suitable pickups 17, as well as the voltage which is generated by means of the pump during idling, which voltage is measured at the motor 15.

If these data indicate that, for example, a high filling level of the brake fluid has been reached in the low pressure accumulator 13, the control unit 16 increases the number of pump strokes. If the filling level in the low pressure accumulator 16 then drops, the number of pump strokes is lowered in order to reduce the delivery capacity of the pump 14 during a braking cycle. If the filling level remains at a predefined level which ensures reliable operation of the motor vehicle given a control value for the number of pump cycles which is transmitted to the pump 14 by the control unit 16, the number of pump strokes remains the same.

The method for using the motor vehicle brake system has been improved in terms of the algorithm for actuating the hydraulic pump which empties the low pressure accumulator.

As a result, the problems of an excessively high filling level of the low pressure accumulator or of an excessively frequent pump activity are reduced. In particular, temperature fluctuations, structural differences and power consumption of the pumps have virtually no influence on the quality of the control of the filling level because the pumping power control which is specified here is adaptive.

It has also been found that the reaction on the brake pedal, which can be felt as vibration and/or bouncing of the pedal by the driver and which is caused by the feeding back of the pump and is often customary in known brake systems, can be significantly reduced compared to the known method. This arises due to a relatively quiet, uniform profile of the pump activity during the pump control in the braking process, which profile is adapted to the respective situation.

The brake system can comprise one or more low pressure accumulators. Two low pressure accumulators are preferably provided. In the case of a plurality of low pressure accumulators, it is possible for the low pressure accumulators not to have the same filling level. It is expedient that the filling level of the low pressure accumulator which has the highest filling level is used as the basis for the algorithm for pump control. This makes it possible to ensure that an excessively low value for the delivery capacity of the pump is never selected, and the blocking of one or more wheels is avoided.

The term "brake control" comprises here both brake pressure closed-loop operations during an ABS braking process as well as brake pressure closed-loop operations which occur in the case of traction control (TC), vehicle dynamics control (ESP), adaptive cruise control (ACC) etc.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:
1. A motor vehicle brake system comprising:
a hydraulic line through which brake pressure can be applied by a brake cylinder to a wheel brake module by a braking medium;
a low pressure accumulator that is connected to the hydraulic line for temporarily receiving excess braking medium and feeding back buffered braking medium via a feedback line;
a feedback pump connected to the feedback line that is configured to be actuated cyclically for setting a delivery capacity in such a way that activation occurs within each braking cycle during a portion of pump cycles of the feedback pump corresponding to the delivery capacity; and a control unit, which is assigned to the feedback pump, that is configured to output a control value for a number of pump cycles for the feedback pump during each braking cycle on the basis of a predefined initial value, wherein the control unit is configured to output the control value taking into account a characteristic value which is derived from wheel speeds or a slip of one or more wheels of the motor vehicle, and wherein the predefined initial value adaptively accounts for:
  (i) a fill level of the braking medium within the low pressure accumulator,
  (ii) a derivative value of the fill level over time, or
  (iii) the fill level of the braking medium within the low pressure accumulator and the derivative value of the fill level over time.

2. The motor vehicle brake system as claimed in claim 1, wherein the control unit is configured to output the control value taking into account a voltage generated by the feedback pump in an idling mode.

3. The motor vehicle brake system as claimed in claim 1, wherein the predefined initial value of the number of pump cycles during the braking cycle is adapted to the results of a learning phase of the control unit.

4. A method for operating a motor vehicle brake system comprising the steps of:
  delivering a braking medium though a hydraulic line to a wheel brake module;
  delivering excess braking medium to a low pressure accumulator that is connected to the hydraulic line;
  cyclically actuating a feedback pump that is connected to a feedback line for feeding back buffered braking medium through the feedback line, wherein the feedback pump is actuated to set a delivery capacity such that activation of the pump occurs within each braking cycle during a portion of pump cycles of the feedback pump corresponding to the delivery capacity; and
  outputting a control value for a number of pump cycles for the feedback pump during each braking cycle on the basis of a predefined initial value, wherein the control value accounts for a characteristic value which is derived from wheel speeds or a slip of one or more wheels of the motor vehicle, and
  wherein the predefined initial value adaptively accounts for:
    (i) a fill level of the braking medium within the low pressure accumulator,
    (ii) a derivative value of the fill level over time, or
    (iii) the fill level of the braking medium within the low pressure accumulator and the derivative value of the fill level over time.

* * * * *